June 29, 1954 G. C. SZIKLAI ET AL 2,682,615

MAGNETIC SWITCHING AND GATING CIRCUITS

Filed May 28, 1952 2 Sheets-Sheet 1

INVENTORS
GEORGE C. SZIKLAI
& KERNS H. POWERS
BY
ATTORNEY

MAGNETIC SWITCHING AND GATING CIRCUITS

Filed May 28, 1952 2 Sheets-Sheet 2

INVENTORS
GEORGE C. SZIKLAI
& KERNS H. POWERS
BY
ATTORNEY

Patented June 29, 1954

2,682,615

UNITED STATES PATENT OFFICE 2,682,615

MAGNETIC SWITCHING AND GATING CIRCUITS

George Clifford Sziklai and Kerns Harrington Powers, Princeton, N. J., assignors to Radio Corporation of America, a corporation of Delaware Application May 28, 1952, Serial No. 290,384

10 Claims. (Cl. 307—88)

This invention relates to electrical switching or gating circuits, and more particularly to improved switching and gating circuits using saturable reactors.

Saturable reactors are frequently used in magnetic amplifiers to provide a stable, trouble free means for amplifying currents or voltages without the use of electron tubes. However, the application of saturable reactors is not limited to magnetic amplifiers.

An object of this invention is to provide an improved apparatus for switching or gating without electron tubes by means of saturable reactors.

Another object of the present invention is to provide an improved apparatus whose function is similar to an Eccles-Jordan trigger circuit without the use of electron tubes.

According to this invention, two saturable reactors are cross coupled in a self-energizing circuit whereby a signal input may be gated or switched to two separate output circuits alternately.

Other and incidental objects of this invention will become apparent upon a reading of the following specification and an inspection of the drawings in which:

Figure 9A shows the output signal obtained from one side of the circuits of Figures 3, 5, and 7; and Figure 9B shows the output signal obtained from the other side of the circuits of Figures 3, 5, and 7;

Figures 1, 2, 3, 4, 5, 6, 7, 8, 9:
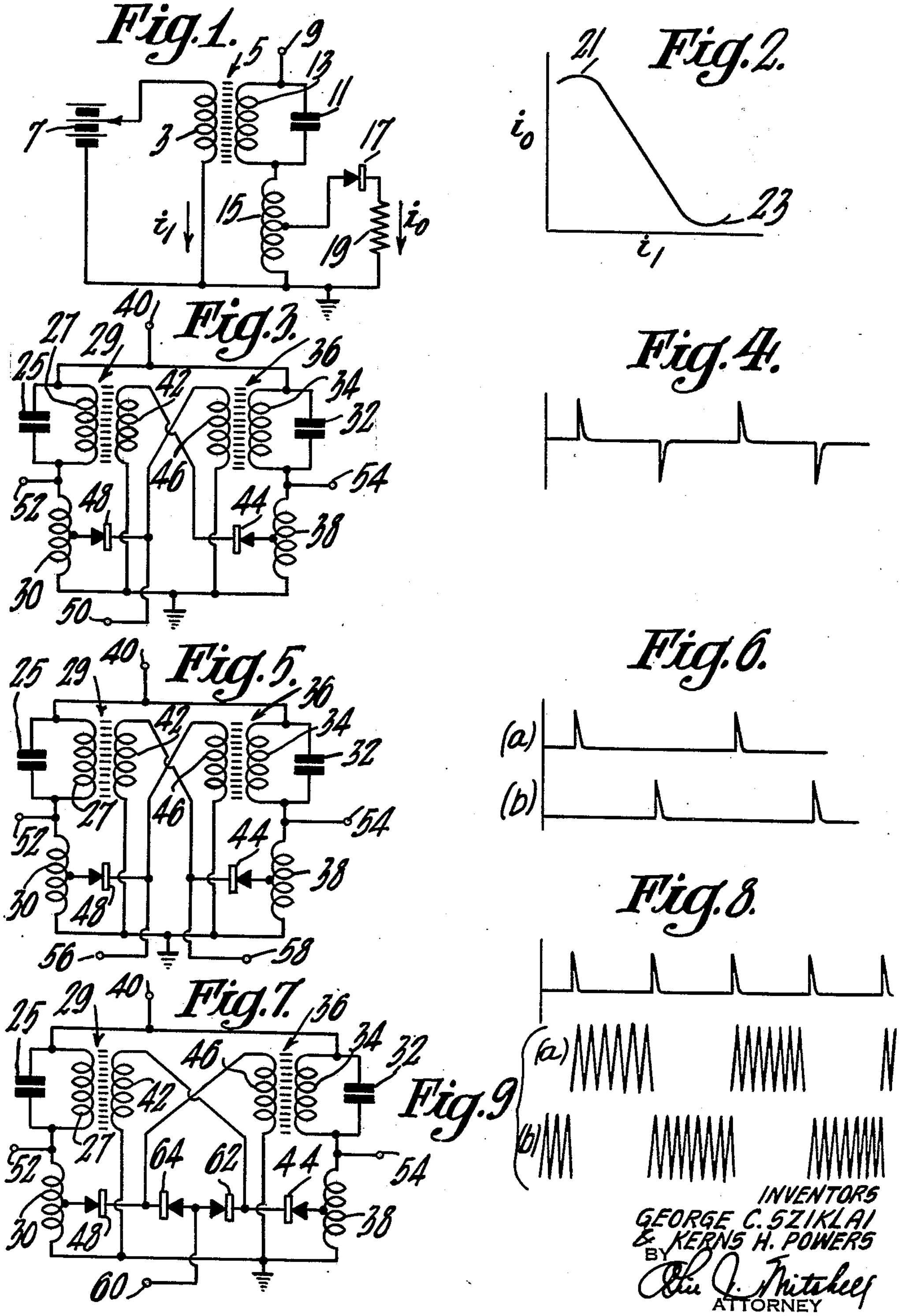
Figure 1 is a simplified circuit diagram of a saturable reactor adapted to provide two steady state conditions of operation.
Figure 2 is a graph of the current relationships in the circuit of Figure 1.
Figure 3 is a circuit diagram of two saturable reactors cross coupled to provide gating of a single input signal to two separate output circuits with the circuit being actuated by alternate positive and negative pulses.
Figure 4 shows suitable positive and negative pulses for actuation of the circuit of Figure 3.
Figure 5 is a circuit diagram embodying the principles of the present invention adapted to be actuated by alternate positive pulses.
Figure 6 shows suitable alternate positive pulses for actuating the circuit of Figure 5.
Figure 7 is a schematic circuit diagram embodying the principles of the present invention adapted to be actuated by a series of positive pulses.
Figure 8 shows a series of suitable positive pulses for actuating the circuit of Figure 7.

Throughout the figures of the drawings the same numerals have been employed to designate similar elements. Referring to the drawings in detail, the simplified circuit of Figure 1 will be considered to explain the principles of operation of the present invention. The current $i_1$ through the control winding or primary winding 3 of the saturable reactor 5 may be varied by adjusting the variable tap on the power supply battery 7. A source of alternating current signals or waves of a predetermined frequency may be applied to the terminal 9. A capacitance 11 is connected across the secondary winding 13 of the saturable reactor 5. The value of this capacitance is chosen such that its combination with the secondary winding 13 provides a parallel resonant circuit for one condition of the current $i_1$ through the control winding 3. An inductance 15 has a value such that its combination with the capacitance 11 forms a series resonant circuit for the selected frequency. Signals appearing across the inductance 15 will be rectified by the diode 17 providing a direct current $i_0$ through the resistance 19. When the current $i_1$ through the control winding 3 is small, the core of the saturable reactor 5 will not be saturated and the inductance 13 in combination with capacitance 11 will be non-resonant at the frequency of the signal applied at terminal 9. Any signal voltage applied to the terminal 9 will divide across the series resonant circuit comprising the capacitance 11 and inductance 15. When current $i_1$ is varied, current $i_0$ will go through a maximum point as shown in Figure 2 at 21. However, as $i_1$ is increased the core of the saturable reactor 5 will become more saturated changing the inductance of the coil 13 so as to bring the combination of the coil 13 and capacitance 11 into parallel resonance at the signal frequency. At this point of resonance, current $i_0$ will pass through a minimum as shown in Figure 2 at 23. This results since the voltage division across the parallel resonant circuit comprising the coil 13 and capacitance 11 in series with the coil 15 will result in a much lower signal voltage drop across coil 15. Thus, the current $i_0$ may be made to pass through a maximum and a minimum by varying the current $i_1$ through the control winding 3.

The present invention combines two such circuits whereby a self-energized switching or gating circuit having two stable conditions of operation is provided. Considering Figure 3, a capacitance 25 is connected across the secondary winding 27 of a saturable reactor 29 and the parallel combination is connected in series with a coil 30 to ground reference potential. In like manner, a capacitance 32 is connected across a secondary winding 34 of a saturable reactor 36, and this parallel combination is connected in series with a coil 38 to ground reference potential. Signals appearing at input terminal 40 are applied equally across both series-parallel circuits. Control winding 42 of the saturable reactor 29 secures its control current from the coil 38 by means of diode 44. In like manner, the control winding 46 of the saturable reactor 36 secures its control current from the coil 30 by means of the diode 48.

When the control pulses shown in Figure 4 are applied to terminal 50, the following action takes place. A positive pulse momentarily increases the current through the control winding 46 of the saturable reactor 36 and this tends to make the combination of secondary winding 34 and capacitance 32 resonant at the signal frequency. This decreases the signal appearing across the coil 38 and thereby reduces the control current supplied to the control winding 42 of the saturable reactor 29 by the diode 44. This in turn decreases the saturation of the core of the saturable reactor 29, making the combination of the capacitance 25 and the coil 27 non-resonant at the signal frequency. This increases the signal voltage appearing across the coil 30, increasing the control current supplied to the control winding 46 of the saturable reactor 36 by the diode 48. This action will continue until the current through the control winding 46 has reached a stable condition. When the circuit has reached this stable condition, the signal voltage applied at terminal 40 is available at terminal 52. This stable condition will maintain itself in the absence of any further actuating pulses applied to the terminal 50. However, a negative pulse applied to the terminal 50 will reverse the above process as follows. A negative pulse will momentarily decrease the current through the control winding 46 of the saturable reactor 36 thereby momentarily decreasing the saturation of the core of the saturable reactor 36 so that the coil 34 in combination with capacitance 32 becomes slightly non-resonant at the signal frequency. This increases the signal voltage across the coil 38 thereby increasing the control currents supplied to the control winding 42 of the saturable reactor 29 by the diode 44. This tends to saturate the core of saturable reactor 29 thereby bringing the combination of capacitance 25 and inductance 27 closer to resonance at the signal frequency, thus reducing the signal voltage across the coil 30 and, in turn, reducing the control currents supplied to the control winding 46 of the saturable reactor 36 by means of the diode 48. This chain of events will repeat itself until the circuit has achieved a stable condition of operation where the signal voltage across coil 38 is at a maximum and the signal voltage across coil 30 is at a minimum. At this time the signal applied to terminal 40 is available at terminal 54. Thus it is seen that we have a means for switching or gating one input signal applied at terminal 40 to two output circuits 52 and 54. Its operation may be likened to that of a mechanical single throw double pole switch in which the input signal is switched alternately to one of two terminals.

Figure 5 is another embodiment of the present invention incorporating means for actuating the circuit by alternate positive pulses applied to opposite sides of the circuit.

Suitable pulses for application to terminal 56 are shown in curve (*a*) of Figure 6, and suitable pulses for application to the other side of the circuit through terminal 58 are shown in curve (*b*) of Figure 6. In overall operation the circuit of Figure 5 is similar to that of Figure 3. The application of a positive pulse to terminal 56 results in a maximum voltage being obtainable at terminal 52, and the application of a positive pulse to terminal 58 results in a maximum signal voltage at terminal 54.

Figure 7 shows another illustrative embodiment of the present invention whereby means are provided for actuating the circuit from one input terminal 60 by means of a series of positive pulses each of which acts to switch the circuit from one condition of operation to the other. A suitable series of positive pulses for application to terminal 60 is shown in Figure 8. Assuming the circuit of Figure 7 is in a condition of operation where a maximum signal voltage is available at terminal 52 and a maximum control current is flowing through the control winding 46 of the saturable reactor 36, a positive pulse will switch the circuit from one condition of operation to another in the following manner. The positive pulse applied through diode 62 to the control winding 42 of the saturable reactor 29 will momentarily increase the saturation of the core of saturable reactor 29. However, the positive pulse will be passed by the diode 62 to a much greater extent than by the diode 64 since the opposite side of diode 64 is already quite positive while the opposite side of diode 62 is much closer to ground reference potential. Also, since the control winding 46 of the saturable reactor 36 is already substantially saturate, any further increase in current through the control winding 46 will have little effect. However, the momentary increase in current through the control winding 42 of the saturable reactor 29 will initiate the chain of events described above with respect to the circuit of Figure 3. When the circuit has achieved a stable condition of operation and a maximum signal voltage is available at terminal 54, the condition with respect to diodes 62 and 64 will be reversed. The next positive pulse applied to the terminal 60 will momentarily increase the current through control winding 46 of the saturable reactor 36 but will have little effect on the control winding 42 of the saturable reactor 29 due to the reversed conditions of polarity on the diodes 62 and 64. The circuit will then switch to a stable condition of operation where a maximum signal voltage is available at terminal 52.

Curve (*a*) Figure 9 shows the output waveform available at terminal 52 of the cirucits of Figures 3, 5, and 7 when appropriate triggering pulses are applied, and curve (*b*) Figure 9 shows the output waveform available at terminal 54 under the same conditions.

The saturable reactors have been shown in the various figures by means of the approved Patent Office symbol for saturable reactors. It will be recognized that a preferred embodiment would have the saturable reactors wound in the manner customary where saturable reactors are used in magnetic amplifiers, i. e. the windings should be so disposed that little or no transformer action obtains between the secondary winding and the control winding. This minimizes any loading of the secondary windings. A description of such a saturable reactor is shown in Figure 8 at page 20 of "The Magnetic Amplifier" by J. H. Rahner, published by Stuart and Richards, London, in 1950.

Figure 10:
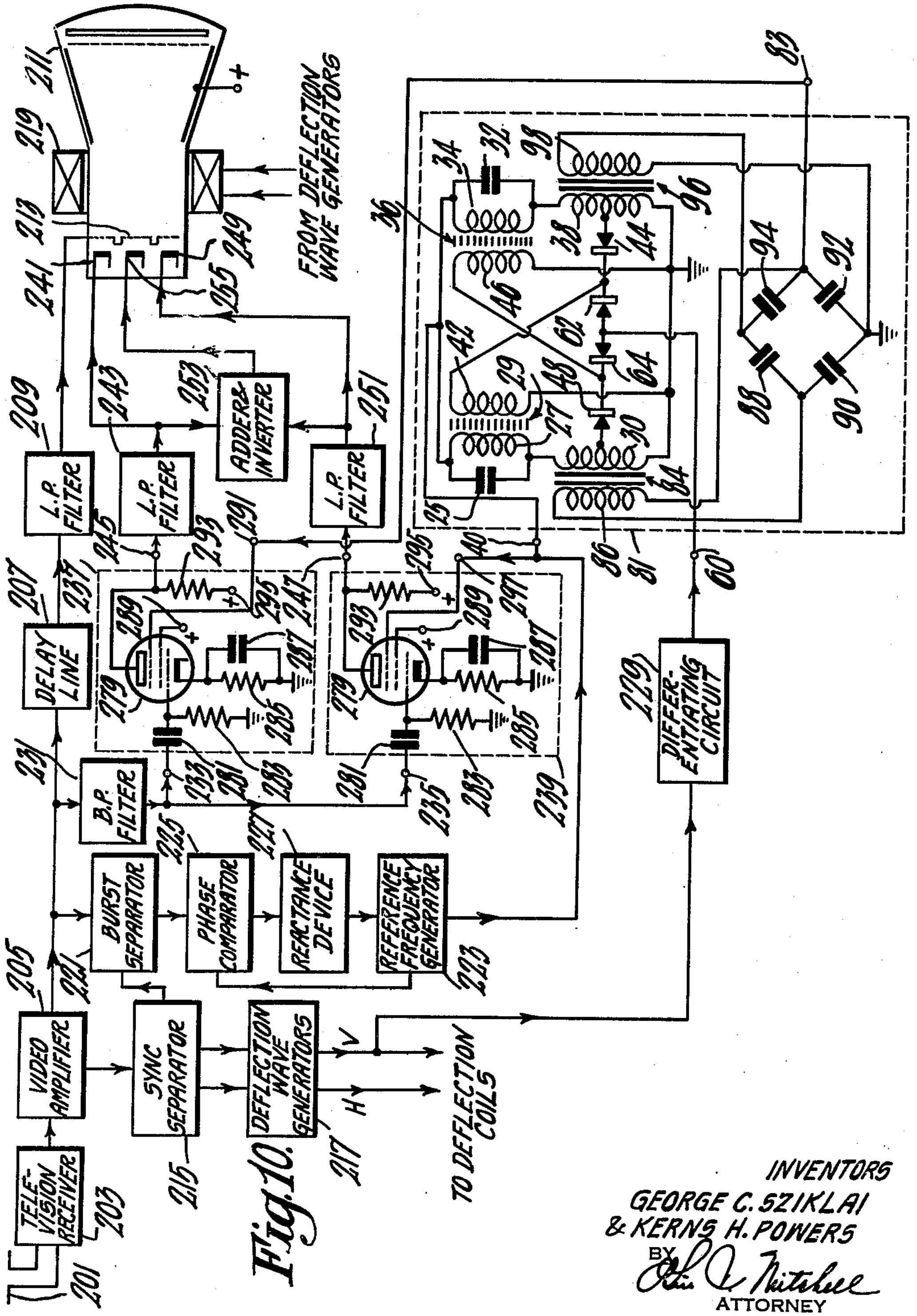
Figure 10 is a combination block and circuit diagram of a color television receiver incorporating an embodiment of the present invention.

Figure 10 shows an illustrative embodiment of the present invention included in a color television receiver adapted to receive color television signals transmitted according to proposed standards may be found in an article entitled Principles tee (NTSC). A discussion of the NTSC standards may be found in an article entitled Principles of NTSC Compatible Color Television by Hirsh, Bailey, and Loughlin appearing at page 88 of "Electronics" for February 1952. Briefly stated, the NTSC standards provide for the transmission of image brightness information by modulating a carrier, and transmitting image color information by phase modulating a sub-carrier in accordance with color information.

Television signals arriving at the receiving antenna 201 are applied to a conventional television receiver 203 which will be assumed to include a conventional R. F. amplifier, a converter, an intermediate frequency amplifier, and a second detector. Video signals from the second detector are applied to the video amplifier 205. The amplified video signals are passed through a delay line 207 and through a low-pass filter 209 to some suitable color reproducing means such as a tri-color kinescope 211 of the type described in A Three-Gun Shadow-Mask Color Kinescope by H. B. Law, "Proceedings of the Institute of Radio Engineers," vol. 39, No. 10, October 1951, p. 1186, and which forms the subject matter of the co-pending patent application of A. C. Schroeder, Serial No. 730,637, filed February 24, 1947, entitled "Picture Reproducing Tube." In this embodiment, the video signals are applied to the control electrode 213 of the tri-color kinescope 211 and convey information representative of elemental brightness variations in the television image.

The output of the video amplifier 205 is also applied to a conventional sync separator 215 which supplies to the deflection wave generators 217 separate signals corresponding to the vertical synchronizing pulse component and the horizontal synchronizing pulse component. In response to the synchronizing signals from the sync separator 215, the deflection wave generators 217 generate suitable waveforms for the horizontal and vertical deflection of the electron beams in the kinescope 211 by means of suitable vertical and horizontal deflection windings in the yoke 219. The amplified video signals from the video amplifier 205 are also applied to a burst separator 221, which may comprise a conventional gating circuit, and gating pulses from the sync separator 215 at horizontal deflection frequency function to separate the color synchronizing signal or "burst" from the video signal. The separated burst is compared in phase with a wave from the reference frequency generator 223 by the phase comparator 225. A voltage developed as a result of this phase comparison is applied to a reactance device 227, which in turn controls the operation of reference frequency generator 223. By this means, the reference frequency generator 223 may be synchronized with the burst. A reference wave of sub-carrier frequency from the reference freqency generator 223 is applied to terminal 40 of a color phase alternator enclosed within dashed lines 81. The color phase alternator 81 is similar to the apparatus shown in Figure 7, but also includes an output circuit adapted to provide a wave of reference frequency alternating in phase at terminal 83. It will be noted that the same numbers have been used to designate the various parts of the color phase alternator 81 as were used for a similar purpose in Figure 7. However in the color phase alternator 81, the inductance 30 forms the primary of a transformer 84, the secondary 86 of which is connected across a balanced bridge such as for example the balanced capacitance bridge comprising capacitances 88, 90, 92, and 94. In like manner, the inductance 38 forms the primary of a transformer 96 having a secondary 98 which is connected across opposite sides of the capacitance bridge comprising capacitances 88, 90, 92, and 94 as was the secondary 86 of the transformer 84. Although in the condition of operation where the maximum signal voltage appears across the inductance 30, the maximum signal voltage will be induced in the secondary 86 and a maximum signal voltage will appear across the capacitance bridge between the connections of capacitances 88, 90 and the connection between the capacitances 92 and 94. A connection between one side of the capacitance bridge and terminal 83 provides a signal voltage of reference frequency at that point. When a triggering pulse appearing at terminal 60 switches the circuit to its second stable condition of operation as described with reference to the Figure 7, a maximum signal voltage appearing across the inductance 38 will induce a maximum signal voltage in the secondary winding 98 which will be applied across the capacitance bridge between the connection of capacitance 88 and 94 and the connection between capacitance 90 and 92 which may also be connected to ground reference potential. However, since the signal voltage is now applied to the capacitance bridge from opposite sides with reference to the first condition of operation, the signal voltage of reference frequency appearing at terminal 83 will now be 180° out of phase with respect to the first condition of operation. By this means, a wave of reference frequency alternating in phase at field rate is available for demodulation of a color television signal transmitted by means of color phase alternation. It will be understood that any balanced bridge may be substituted for the capacitance bridge used in this embodiment, although it is believed the capacitance bridge is to be preferred because of its simplicity and high "Q" low loss characteristics.

Triggering pulses for actuating the color phase alternator 81 may be derived from a differentiating circuit 229 which functions to differentiate the vertical flyback pulses appearing in the original output circuit of the deflection wave generators 217. Thus a series of pulses at field rate are applied to terminal 60 of the color phase alternator 81.

The circuits of Figure 3 and Figure 5 may be substituted for the one shown in the illustrative embodiment of Figure 10. However, it will then be necessary to provide suitable triggering pulses as shown in Figure 4 and Figure 6. It will be recognized that both the rate and sense of alternation must correspond to that used in the transmitter. While circuits may be devised to provide the waveforms of Figures 4 and 6 for positive synchronization of the sense of the color phase alternator with the transmitted signal, satisfactory operation may be obtained in the illustrative embodiment of Figure 10 by momentarily interrupting the operation of the receiver until the sense of the receiver color phase alternator corresponds to that of the transmitter. Once this condition is established, proper sense synchronization will continue in the absense of any further interruption. If automatic sense synchronization is desired, the circuits of Figures 3 and 5 are recommended.

The portion of the video signal from video amplifier 205 containing the color sub-carrier signal may be separated from the amplified video signal by means of a bandpass filter 231. In the case where the frequency of the color sub-carrier wave is approximately 3.898125 megacycles, the pass band of the bandpass filter 231 may be chosen to be nominally 2.9 to 4.3 megacycles. The output of the bandpass filter is then applied to the input terminal 233 of the apparatus within the dashed rectangle 237, which functions to extract the red color difference signal from the sub-carrier wave. In like manner, the color sub-carrier wave is also applied to input terminal 235 of the apparatus enclosed within the dashed rectangle 239, which functions to extract the blue color difference signal from the color sub-carrier wave. The circuit details as well as the mode of operation of the apparatus enclosed within dashed rectangles 237 and 239 will be discussed in detail in a later portion of the specification.

The red color difference signal appearing at terminal 245, which is equal to the red component of the original television image minus the total brightness signal, is coupled to one cathode 241 of the tri-color kinescope 211 through a low-pass filter 243. In like manner, the blue color difference signal appearing at terminal 247 is coupled to a cathode 249 of the kinescope 211 by means of a low-pass filter 251. Since only three primary colors are used, the portion of the brightness signal which is not blue or red must be green. Therefore, the green color difference signal may be obtained by adding a portion of the negative blue color difference signal to a portion of the negative red color difference signal. However, where the addition is accomplished by means of electron tubes feeding a common load, a 180° phase shift occurs between the input signal and the output signal. Therefore, in the receiver of Figure 2 the green color difference signal is obtained by means of the adder and inverter 253. By adding 51% of the negative red color difference signal to 19% of the negative blue color difference signal the green color difference signal may be obtained in the receiver. A mathematical analysis and an explanation of this operation is included in the article "Principles of NTSC Compatible Color Television" supra, at page 90. This green color difference signal from the adder and inverter 253 is applied to a third cathode 255 of the tricolor kinescope 211. The interaction of the signals applied to the tricolor kinescope may also be considered one of addition. The application of a brightness signal to control electrode 213, working in conjunction with the color difference signals applied to cathodes 241, 255, and 249, results in varying the current of the individual cathode ray beams associated with each of the three primaries in accordance with the particular color component. Thus, the three primary colors of the original television image are recreated in their appropriate proportions at the tricolor kinescope 211.

The apparatus enclosed within dashed rectangle 237 which functions to extract the red color difference signal from the sub-carrier signal is essentially a heterodyne mixer. The color sub-carrier signal applied to terminal 233 is coupled to the control electrode of electron tube 279 by means of a capacitance 281. A suitable grid leak resistance 283 is connected between the control electrode of the electron tube 279 and ground reference potential. A cathode resistor 285 is connected between the cathode of electron tube 279 and ground reference potential to provide self-biasing means, and a capacitance 287 provides a low impedance A.-C. connection between the cathode and ground reference potential. The screen grid of electron tube 279 is adapted to be connected to a suitable source of positive potential by means of a terminal 289. A wave of sub-carrier frequency alternating in phase appearing at terminal 291 is applied to the suppressor grid of electron tube 279. A load resistance 293 is connected between the anode of electron tube 279 and terminal 295 which is adapted to be connected to a suitable source of positive potential. The anode of electron tube 279 is also connected to an output terminal 245. By heterodyning the sub-carrier wave alternating in phase with the sub-carrier signal, the red color difference signal is available at the output terminal 245.

The apparatus enclosed within dashed line 239 for extracting the blue color difference signal from the color sub-carrier may be the same as that enclosed within the dashed rectangle line 237. Therefore, the same numbers have been used to designate the similar parts except in the case of the input and output terminals. Thus a wave of sub-carrier frequency applied to terminal 297 is heterodyned with the color sub-carrier signal appearing at terminal 235 and a blue color difference signal is available at terminal 247.

From the foregoing description, it will be apparent that apparatus is provided for switching two input signals to a common output circuit alternately, and for effecting the phase alternation of a wave through the application of the present invention. Such apparatus, in accordance with the invention, may be used to advantage in color television systems where color phase alternation is desired, as well as in other applications where it is desired to switch one input signal to two output circuits alternately.

What is claimed is:

1. Apparatus including the combination of a first saturable reactor and a second saturable reactor, each of said saturable reactors having at least a primary winding and a secondary winding, a capacitance connected across the secondary winding of said first saturable reactor, another capacitance connected across the secondary winding of said second saturable reactor, a first inductance connected between one end of the secondary winding of said first saturable reactor and ground reference potential, a second inductance connected between one end of the secondary winding of said second saturable reactor and ground reference potential, and means saturating said first saturable reactor and said second saturable reactor alternately.

2. Apparatus according to claim 1, wherein said means saturating said first saturable reactor and said second saturable reactor alternately includes, unilateral conducting means connected between said second inductance and one end of the primary winding of said first saturable reactor, and a second unilateral conducting means connected between said first inductance and one end of said primary winding of said second saturable reactor.

3. Apparatus according to claim 2, including triggering means coupled to at least one of said unilateral conducting means.

4. Apparatus including the combination of, a first parallel resonant circuit and a second parallel resonant circuit, a first saturable reactor and a second saturable reactor, each of said saturable reactors having at least a primary winding and a secondary winding, said first parallel resonant circuit comprising a capacitance and the secondary winding of said first saturable reactor, said second parallel resonant circuit comprising a capacitance and the secondary winding of said second saturable reactor, a first inductance and a second inductance, said first parallel resonant circuit connected in series with said first inductance, said second parallel resonant circuit connected in series with said second inductance, and means saturating said first saturable reactor and said saturable reactor alternately.

5. Apparatus according to claim 4, wherein said means saturating said first saturable reactor and said second saturable reactor alternately includes, unilateral conducting means connected between said second inductance and one end of the primary winding of said first saturable reactor, and a second unilateral conducting means connected between said first inductance and one end of said primary winding of said second saturable reactor.

6. Apparatus according to claim 5, including triggering means coupled to at least one of said unilateral conducting means.

7. An electronic switch comprising in combination, a saturable reactor, said saturable reactor particularly characterized in that one of its windings forms a part of a resonant circuit which is resonant at a predetermined frequency at one degree of saturation, means for changing the degree of saturation of said saturable reactor back and forth between the one degree of saturation at which said circuit is resonant and a degree of saturation at which said circuit is non-resonant, an input circuit coupled to said resonant circuit, and an output circuit connected in series with said resonant circuit.

8. Apparatus for providing phase alternation of a wave including the combination of, a first parallel resonant circuit and a second parallel resonant circuit, a first saturable reactor and a second saturable reactor, each of said saturable reactors having at least a primary winding and a secondary winding, said first parallel resonant circuit comprising a capacitance and the secondary winding of said first saturable reactor, said second parallel resonant circuit comprising another capacitance and the secondary winding of said second saturable reactor, a first output transformer and a second output transformer, each of said output transformers having a primary and secondary winding, said first parallel resonant circuit connected in series with the primary winding of said first output transformer, said second parallel resonant circuit connected in series with the primary winding of said second output transformer, a balanced alternating current bridge, said secondary winding of said first output transformer connected across said alternating current bridge, said secondary winding of said second output transformer connected across opposite sides of said alternating current bridge, and means saturating said first and said second saturable reactors alternately.

9. Apparatus for providing phase alternation of a wave including the combination of, an electrical switching circuit adapted to switch an input signal to two separate output circuits alternately, said electrical switching circuit comprising a first saturable reactor and a second saturable reactor, each of said saturable reactors having at least a primary winding and a secondary winding, a first parallel resonant circuit including a first capacitance connected in parallel with the secondary winding of said first saturable reactor, a second parallel resonant circuit including a second capacitance connected in parallel with the secondary winding of said second saturable reactor, the secondary winding of said first saturable reactor coupled to one of said output circuits, the secondary winding of said second saturable reactor coupled to the other of said output circuits, a phase shifting network, said phase shifting network connected between said first output circuit and said second output circuit, and means saturating said first saturable reactor and said second saturable reactor alternately.

10. In the apparatus of claim 9, said means saturating said first and said second saturable reactors alternately, including unilateral conducting means connected between one of said output circuits and one end of said primary winding of said second saturable reactor, unilateral conducting means connected between the other of said output circuits and one end of the primary winding of said second saturable reactor, and triggering means coupled to at least one of said unilateral conducting means.

References Cited in the file of this patent

UNITED STATES PATENTS

| Number | Name | Date |
|---|---|---|
| 2,519,513 | Thompson | Aug. 22, 1950 |
| 2,524,154 | Wood | Oct. 3, 1950 |
| 2,574,438 | Rossi et al. | Nov. 6, 1951 |

OTHER REFERENCES

Publication: "Ferroresonant Flip-Flops," Electronics, April 1952, pages 121–123.